US005213861A

United States Patent [19]

Severson et al.

[11] Patent Number: 5,213,861

[45] Date of Patent: May 25, 1993

[54] WOODEN TILE AND METHOD FOR MAKING SAME

[76] Inventors: Thomas A. Severson; Scott A. Forbes, both of Box 45, Roxbury, Vt. 05669

[21] Appl. No.: 754,747

[22] Filed: Sep. 4, 1991

[51] Int. Cl.[5] .......... E04F 13/08; B32B 3/10; B32B 3/06

[52] U.S. Cl. .......... 428/52; 428/50; 52/388; 52/586

[58] Field of Search .......... 428/52, 54, 44, 50; 52/388, 586

[56] References Cited

U.S. PATENT DOCUMENTS

| | | | |
|---|---|---|---|
| 1,520,313 | 12/1924 | Skinner et al. . | |
| 2,118,841 | 5/1938 | Elmendorf | 20/75 |
| 2,151,505 | 3/1939 | Elmendorf | 20/75 |
| 3,279,138 | 10/1966 | Dittmar | 52/384 |
| 3,535,839 | 10/1970 | Strubing | 428/50 |
| 4,388,788 | 6/1983 | Bosco | 52/390 |
| 4,731,140 | 3/1988 | Yontrarak | 156/154 |

FOREIGN PATENT DOCUMENTS

| | | | |
|---|---|---|---|
| 59-49904 | 3/1984 | Japan | 428/50 |
| 233215 | 4/1969 | U.S.S.R. | 428/50 |
| 787169 | 12/1957 | United Kingdom | 52/389 |
| 960006 | 6/1964 | United Kingdom | 428/50 |
| 1207685 | 10/1970 | United Kingdom | 52/389 |

*Primary Examiner*—Alexander S. Thomas

*Attorney, Agent, or Firm*—Michael, Best and Friedrich

[57] ABSTRACT

Wooden tiles including a plurality of smaller rectangular blocks, flat grain or preferably end grain, are made by providing in each block at least one lateral groove extending parallel to and spaced inwardly from the end edges of the block, at least one longitudinal groove extending parallel to and is spaced inwardly from the side edges of the block and intersecting the lateral groove(s) at a right angle. When the blocks are aligned in abutting relationship, either side by side, side to end or end to end, to form a tile of the desired pattern, the grooves are aligned to form a grid-like network of continuous, rectilinear channels. The channels are substantially filled with a relatively flexible, synthetic plastic material capable of becoming flowable upon being heated to a predetermined temperature and hardening upon subsequent cooling. A portion of the plastic material is diffused into the wood in the immediate vicinity of the channels while in a flowable state and becomes bonded to the wood upon cooling to thereby hold the blocks together and yet permit movement of the blocks relative to each other. In one embodiment, the plastic material is preformed into a grid including intersecting ribs which fit into the channel network and sufficient heat and pressure are applied to the top edge of the ribs to cause a portion thereof to become flowable and diffused into the wood. In another embodiment, the plastic material is extruded into the channel network to effectively form a grid in situ.

12 Claims, 4 Drawing Sheets

Fig. 3
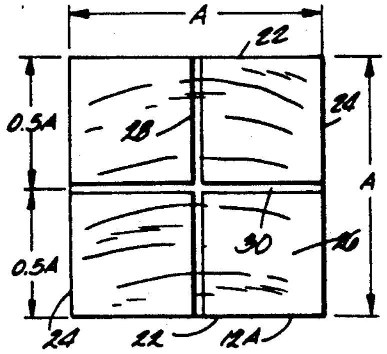
Fig. 4
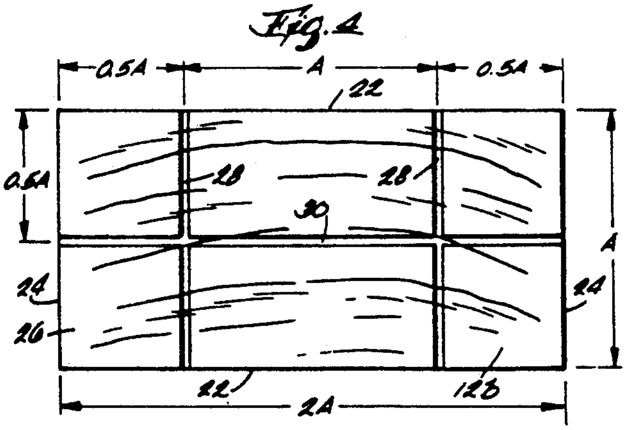
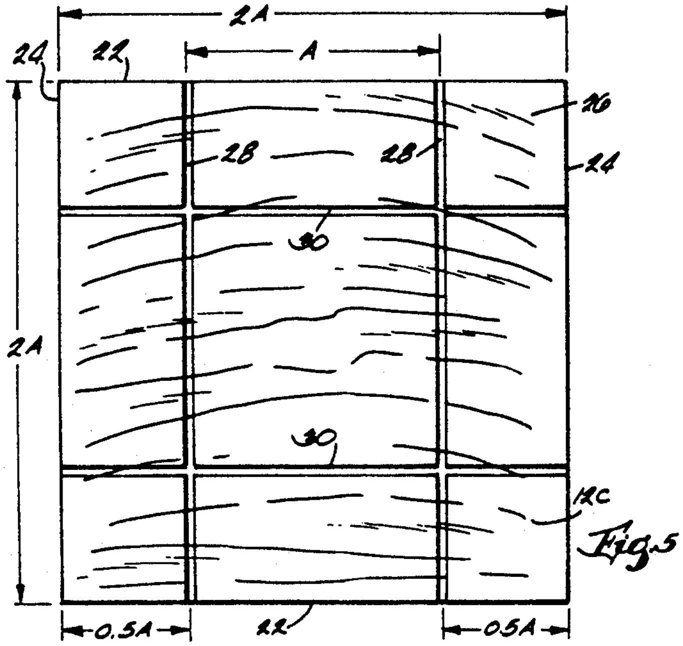
Fig. 5
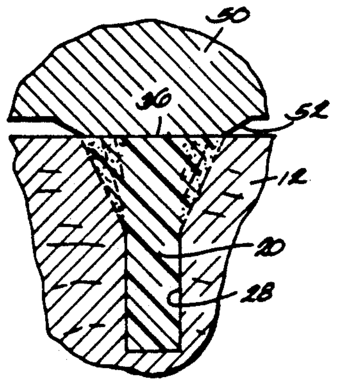
Fig. 9
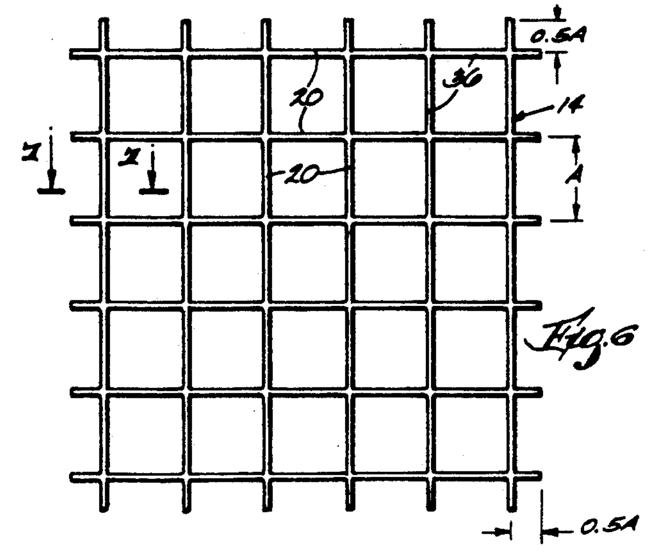
Fig. 6
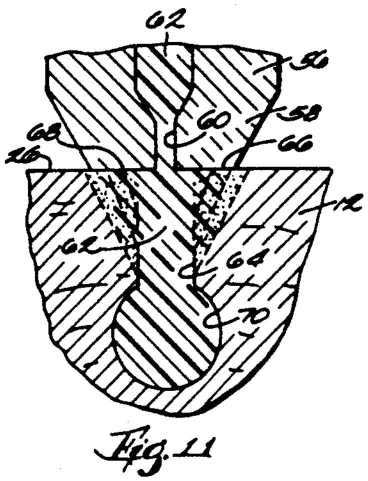
Fig. 11

WOODEN TILE AND METHOD FOR MAKING SAME

BACKGROUND OF THE INVENTION

I. Field of the Invention

This invention relates to wooden tiles and, more particularly, to wooden tiles including a plurality of smaller blocks in abutting relationship and methods for making such tile.

Wooden tiles or panels have been used as a floor covering, a border for carpeted floors and for other decorative purposes for a number of years. Parquet-type wooden panels or tiles include a plurality of wooden slates held together in some manner. Another type wooden panel or tile includes small blocks of wood which are arranged in a mosaic pattern and held together in some manner. The tiles or panels usually are adhesively bonded to a subfloor or wall.

II. Description of Related Prior Art

One prior approach for holding wooden slats or blocks together employs some sort of rigid or flexible backing sheet which is adhesively bonded to the underside of the slats or blocks. Representative prior art patents disclosing such an approach include Skinner et al. U.S. Pat. No. 1,520,313, Dittmar U.S. Pat. No. 3,279,138, Yontrarak U.S. Pat. No. 4,731,140, British Patent 787,169, British Patent 960,006 and Japanese Patent 59-49904. When a rigid backing is used, the individual blocks cannot move relative to each other which can cause warping and the ability of the tile to conform with an uneven surface during installation is limited. Even when a flexible backing support is used, the adhesive can seep into the joints between the slats or blocks and bond them together so they cannot move relative to each other sufficiently to avoid warping. The slats or blocks typically are flat or straight grain rather than end grain which can provide better wear characteristics and produce a more decorative appearance.

Another prior approach for holding wooden slats or blocks together employs flexible tie members, such as wire, which are press fitted into and/or glued in grooves in the underside of the slats. Representative prior art patents disclosing such an approach are Bosco U.S. Pat. No. 4,388,788 and Russian Patent 233215. The wire tie members add to the overall weight of the tile and require a carbide or other special cutting blade when the tiles have to be cut to fit during installation.

Wire tying has been used for end grain blocks 2 or more inches thick. However, it generally cannot be used for relatively thin (e.g., less than ¾ inch) end grain blocks because of the stress resulting from the force required to push the wire down into grooves in the blocks. This force, which tends to open the grooves, is perpendicular to the grain for end grain block and parallel to the grain for flat grain blocks. Thus, relatively thin end grain blocks can split when the wire is forced into the groove or stressed in the vicinity of the grooves to the point they split during handling, installation or use after installation.

Elmendorf U.S. Pat. No. 2,118,841 discloses the use of end grain wooden blocks for floor tiles. The blocks, which are 1 inch or less in width, length and thickness, are arranged in rows and side by side and held together by gluing to a flexible backing, such as felt, or by properly located grooves containing suitable bonding and tie means. These grooves run across the length or width of the blocks at the joint between blocks. One half of each groove lies in one of two adjacent rows of blocks and the other half in the other row. The cord and/or adhesive filling the grooves is bonded to the two rows of blocks and ties them together as well as tying together the blocks in each of the two rows. Considerable labor is required to apply an adhesive in the grooves and, when used, installing a flexible cord in the grooves. Elmendorf U.S. Pat. No. 2,151,505 discloses a similar approach for holding wooden blocks together.

British Patent 1,207,685 discloses a honeycomb-surfaced plastic base plate including rectangular cells in to which individual ceramic tiles are press fitted.

SUMMARY OF THE INVENTION

An object of the invention is to provide a wooden tile made from smaller rectangular blocks, either flat grain or end grain, tied together with a light weight flexible means in a manner which permits the blocks to move relative to each other.

Another object of the invention is to provide such a wooden tile which does not require a separate adhesive.

Another object of the invention is to provide a wooden tile including rectangular blocks, either flat or end grain, which are tied together both laterally and longitudinally by flexible means, which can be of different sizes and which can be arranged in a variety of different patterns.

Another object of the invention is to provide a simplified method for making wooden tiles having the above advantageous characteristics.

Another object of the invention is to provide such a method which is adaptable for automation to provide high speed production rates.

Other objects, aspects and advantages of the invention will become apparent to those skilled in the art upon reviewing the following detailed description, the drawings and the appended claims.

The invention provides a wooden tile made from a plurality of smaller rectangular wooden blocks including a top side having a wearing surface, which is either flat grain or end grain, and a method for producing same. Each block has at least one groove in the underside extending parallel to and spaced inwardly from either the side edges or the end edges thereof and the blocks are dimensioned and the grooves disposed such that, when the blocks are arranged in an abutting relationship, either side by side, side to end or end to end, to form a tile, the grooves are aligned to form a continuous rectilinear channel extending parallel to one pair of the opposed peripheral edges of the tile and at least substantially the entire dimension between the other pair of opposed peripheral edges of the tile. A relatively flexible, synthetic plastic material, capable of becoming flowable upon being heated to a predetermined temperature and hardening upon subsequent cooling, is disposed in and substantially fills the channel. A portion of the plastic material is diffused into the wood in the immediate vicinity of the channel while in a flowable state and becomes bonded to the wood upon cooling to thereby hold the blocks together and yet permit movement of the blocks relative to each other.

In one embodiment, the plastic material is preformed into a rib which fits into the channel and has a height approximating the depth of the channel. After the rib is inserted into the channel, sufficient heat and pressure is applied to the top edge of the rib to cause a portion to become flowable and diffused into the wood.

In another embodiment, the plastic material is extruded into the channel in a molten state and under pressure to diffuse a portion into the wood.

In one embodiment, the tile is rectangular, each of the blocks includes at least one first groove extending laterally between the side edges thereof and parallel to the end edges thereof and at least one second groove extending longitudinally between the end edges, parallel to the side edges and perpendicularly to the first groove and the grooves are arranged so that, when the blocks are arranged in abutting relationship, either side by side, side to end or end to end to form a tile, the grooves are aligned to form a grid-like network of channels intersecting at right angles. The plastic can be preformed into a grid including a plurality of ribs which intersect at right angles, are arranged to fit into the channel network and have a height approximating the depth of the channels and, after the grid is inserted into the channels, sufficient heat and pressure are applied to the top edges of the ribs to cause a portion of the ribs to become flowable and diffused into the wood in the immediate vicinity of the channels. Alternately, the plastic material can be extruded into the channel network in a molten state and under pressure.

BRIEF DESCRIPTION OF THE DRAWINGS

FIGS. 3-5 are bottom plan views of different size wooden blocks for making wooden tile of the invention, showing the groove arrangement in the underside of the blocks.

FIG. 6 is a top plan view of a grid used to tie the wooden blocks together in accordance with one embodiment of the invention.

FIG. 9 is an enlarged, fragmentary, sectional view illustrating a heated platen in place to melt the top portion of the grid ribs and heat the wood in the immediate vicinity of a channel formed by grooves in the wooden blocks.

FIG. 11 is an enlarged, fragmentary, sectional view illustrating an alternate embodiment for tying the wooden blocks together in which a molten thermoplastic material is extruded into channels formed by grooves in the wooden blocks.

DESCRIPTION OF THE PREFERRED EMBODIMENTS

Figure 1:
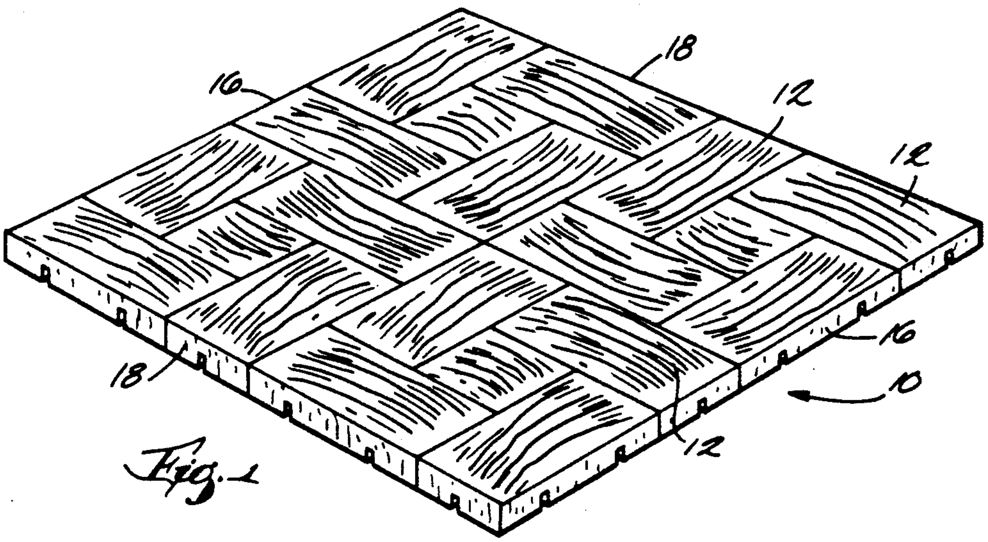
FIG. 1 is a top perspective view of a wooden tile embodying the invention.

Wooden tiles of the invention can employ blocks cut so that the wearing surface is flat grain or end grain. End grain blocks provide a number of advantages over flat grain, including longer and more even wear; more resistance to indentations, such as by high heels or the like, thereby permitting use of soft wood previously considered unacceptable for use in floor tile; capability of absorbing more sealer to provide prolonged protection; and end grains of different woods can provide a more decorative appearance. For that reason, the invention will be illustrated and described in connection with using end grain blocks.

As used herein, the term "tile" means a wide variety of panel-like products made up of a plurality of relatively thin wooden blocks, such as square and elongated rectangular floor and wall tile, plank flooring, inlaid carpet border tile, kitchen and bathroom counter top tile and the like.

Referring to FIGS. 1-9, a rectangular wooden tile 10 (FIGS. 1 and 2) in accordance with one embodiment of the invention includes a plurality of relatively thin rectangular wooden blocks 12 which are held together in abutting relationship by a synthetic plastic grid 14 (FIG. 6). The tile 10 has first and second pairs of opposed peripheral edges 16 and 18. The grid 14 includes a plurality of intersecting ribs 20 which fit into grooves in the underside of the blocks 12 and are bonded to the wood in the immediate vicinity of the grooves as described below. While the blocks 12 may all be the same size and cut from the same type wood, in the specific embodiment illustrated in FIGS. 1-8, the blocks 12 have different sizes and are cut from different colored and grained woods to provide the capability of making tiles having a variety of geometric and color patterns. The specific gravities of the different woods should be relatively close in order to minimize significant differences in expansion and shrinkage characteristics during use.

As illustrated in FIGS. 3-5, each block **12*a*, 12*b* and 12*c* has opposed side edges 22, opposed end edges 24 and a bottom or underside 26 including one or more laterally extending grooves 28 and one or more longitudinally extending grooves 30**. While a square does not have lateral and longitudinal dimensions of different sizes in a literal sense, the terms "lateral", "laterally", "longitudinal" and "longitudinally" are used herein to identify two different dimensions of rectangles including squares.

Figure 2:
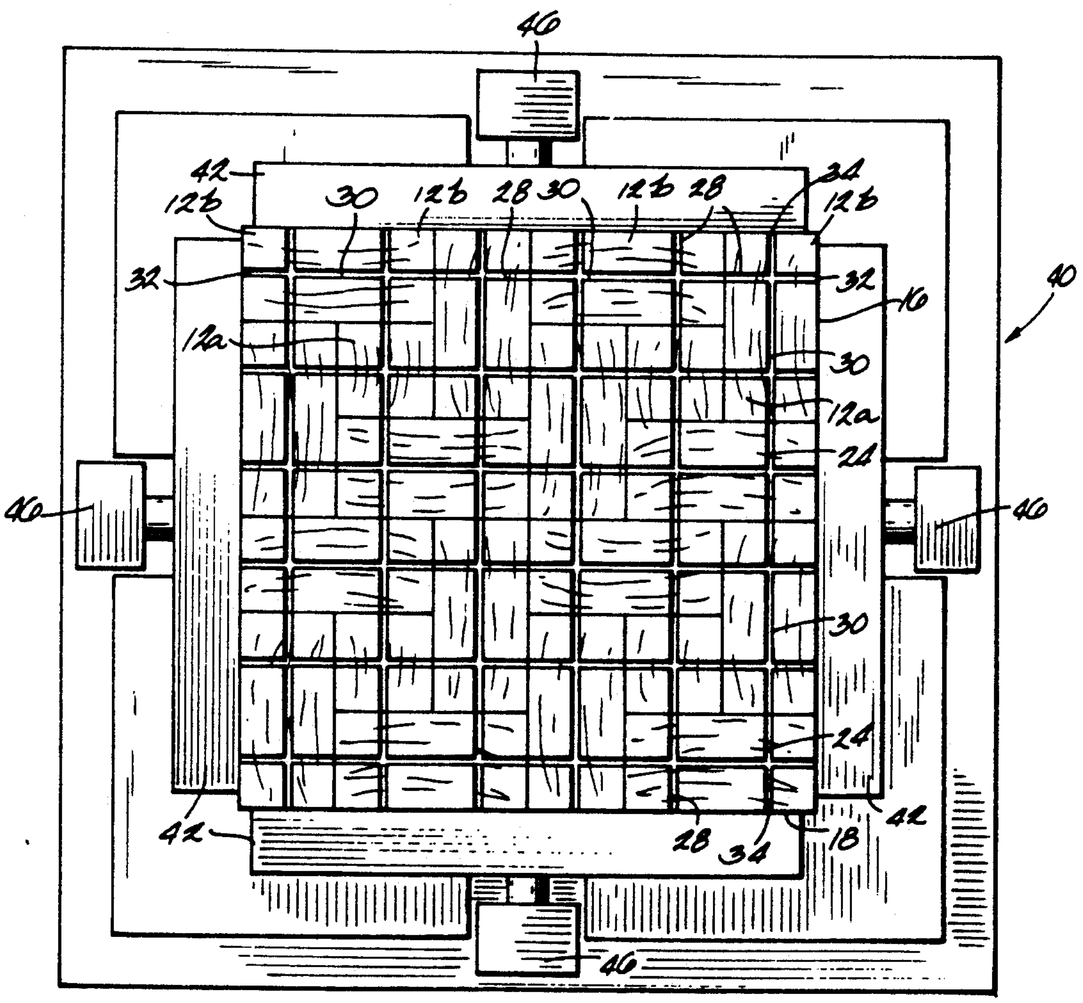
FIG. 2 is a bottom plan view of the wooden tile illustrated in FIG. 1, shown with rectangular blocks in a clamping fixture prior to installation of a plastic grid or extrusion of a molten plastic into the intersecting channels formed by grooves in the blocks.
Figure 8:
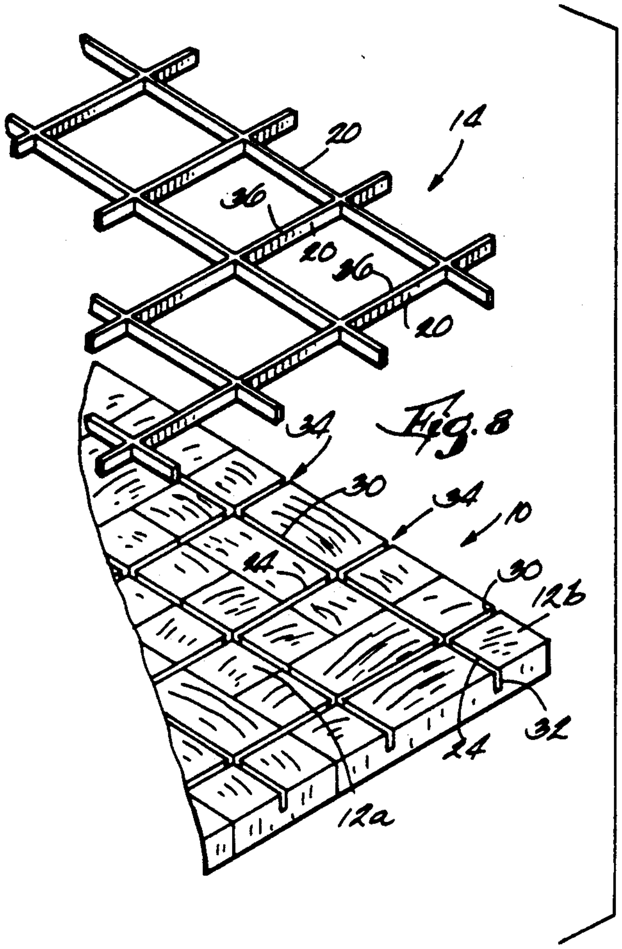
FIG. 8 is a fragmentary, exploded view of assembled blocks and a grid prior to installation of the grid.

The blocks **12*a*, 12*b* and 12*c* are dimensioned and the lateral and longitudinal grooves 28 and 30 are located so that, when they are laid face down (i.e., wearing surface down) and arranged in abutting relationship, either side by side, side to end or end to end, to form a tile as illustrated in FIG. 2, the lateral and longitudinal grooves 28 and 30 are aligned to form continuous, rectilinear channels 32 and 34 extending between the opposed peripheral edges 16 and 18, respectively, of the tile 10. The channels 32 and 34 intersect at right angles and form a grid-like network of channels. The tile 10 specifically illustrated in FIGS. 1 and 2 includes tiles 12*a* (FIG. 3) and 12*b* (FIG. 4**) only.

The number and location of the lateral and longitudinal grooves 28 and 30 depend on the size and the rectangular shape of the blocks 12. For square tiles, the smallest block **12*a* is square and the dimensions of each side is A, the number of lateral grooves 28 is 1, the number of longitudinal grooves 30 is 1 and the centers of the lateral and longitudinal grooves 28 and 30 are spaced inwardly 0.5A from the end edges 24 and the side edges 22, respectively. When the lateral and longitudinal dimensions of a block is X·A and Y·A, respectively, with X and Y being an integer greater than 1, the number of lateral grooves 28 is Y, the number of longitudinal grooves 30 is X, the centers of the lateral grooves closest to the end edges 24 are spaced inwardly therefrom 0.5A, the centers of all the lateral grooves 28 are uniformly spaced A from each other, the centers of the longitudinal grooves 30 closest to the side edges 22 are spaced inwardly therefrom 0.5A and the centers of all the longitudinal grooves 30** are uniformly spaced A from each other.

In the specific embodiment illustrated in FIGS. 1-9, the assembled size of the tile is 11 ¼ inches by 11 ¼ inches, the smallest block **12*a* (FIG. 3) is square and the dimension A for each side is 1 ⅞ inches. The lateral and longitudinal grooves 28 and 30 are centered in the block 12*a*, i.e., the centers thereof are spaced inwardly 0.5A (15/16 inch) from the end edges 24 and the side edges 22**, respectively. In the following description of different size blocks, all dimensions are inch or inches.

FIG. 4 illustrates another size block **12*b* which is equivalent to two smallest square blocks 12*a* side by side. The block 12*b* has a lateral dimension A (1 ⅞), a longitudinal dimension Y·A(2×1 ⅞=3¾), 1 longitudinal groove 30 and Y (2) laterally extending grooves 28. The center of the longitudinal groove 30 is spaced inwardly 0.5A (15/16) from the side edges 22, the centers of the lateral grooves 28 are spaced inwardly 0.5A (15/16) from the end edges 24 and the centers of the lateral grooves 28** are spaced apart A (1 ⅞) from each other.

FIG. 5 illustrates another size block **12*c* which is a square equivalent to two side by side rows of the smallest square block 12*a*. The block 12*c* has a lateral dimension X·A(2×1 ⅞=3 ¾), a longitudinal dimension Y·A(2×1 ⅞=3¾), Y(2) lateral grooves 28 and X(2) longitudinal grooves 30. The centers of the lateral grooves 28 are spaced inwardly 0.5A (15/16) from the end edges 24 and spaced A (1 ⅞) from each other. The centers of the longitudinal grooves 30 are spaced inwardly 0.5A (15/16) from the side edges 22** and spaced A (1 ⅞) from each other.

Other size blocks for use in making a tile 11 ¼ by 11 ¼ inches can be A (1 ⅞) by 3·A (5 ⅝), A (1 ⅞) by 4·A (7 ½), 2·A (3 ¾) by 3·A (5 ∢), 2·A (3 ¾) by 4·A (7 ½), 3·A (5 ⅝) by 3·A (5 ⅝) and 3·A (5 ⅝) by 4·A (7 ½). It should be recognized that the above dimensional relationships are applicable for larger and smaller square tiles and elongated, rectangular tiles. With such a diversity in block size, the above-described groove spacing and end grain blocks of different color and/or end grain appearance, it is possible to create a large number of different patterns and still have intersecting channels uniformly spaced in parallel relationship for receiving a grid. For elongated tile products including elongated rectangular blocks or slats in a single roll and abutting side by side, it is important only that the lateral grooves in the individual slats are spaced inwardly from the opposite ends of the slat to form one or more continuous rectilinear channels when the slats are in place.

The blocks 12 preferably are cut from kiln-dried wood or dried after cutting in order to minimize warping after the tiles are assembled and/or installed. The lateral and longitudinal grooves 28 and 30 preferably are cut in the underside of the blocks in a suitable manner, such as with a conventional radial saw, prior to assembling the blocks into a tile configuration. However, if desired, the grooves can be cut into the underside after the blocks have been installed in a fixture for holding them together in a tile configuration. The lateral and longitudinal grooves 28 and 30 preferably are the same width and depth. As a guide, the depth of the lateral and longitudinal grooves 28 and 30 typically is at least 25%, but no greater than 50%, of the block thickness. For ½ inch thick blocks, the lateral and longitudinal grooves 28 and 30 usually are about ⅛ to about ¼ inch deep. For the plastic material of the grid 14 to provide the reinforcement required to keep the blocks 12 tied together during handling associated with packaging, transportation, unpackaging and installation and yet provide the tile with the desired degree of flexibility for installation and during use, the width of the lateral and longitudinal grooves 28 and 30 generally are within the range of about 1/16 to about 3/16 inch.

Figure 7:
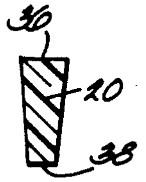
FIG. 7 is a sectional view taken generally along line 7—7 in FIG. 6.

The grid ribs 20 (FIG. 6) intersect at right angles, correspond in number to the number of intersecting channels and are dimensioned and arranged in a manner to fit into the lateral and longitudinal grooves 28 and 30 of the wood blocks. That is, the centers of the ribs 20 are uniformly spaced apart A and the outer ones are spaced inwardly 0.5A from the outermost periphery of the grid 14. The height and thickness of the ribs 20 preferably approximate the depth and width of the lateral and longitudinal grooves 28 and 30, respectively. Preferably, the maximum thickness of the ribs 20 is slightly greater (e.g., 0.005 inch thicker) than the width of the grooves 28 and 30 to insure a snug fit. Because of the flexible nature and relatively low coefficient of the friction of the plastic material from which the grid is formed, the force required to push the ribs 20 down into the grooves 28 and 30 is relatively low, thereby minimizing the stress applied in the vicinity of the grooves. As shown in FIG. 7, the ribs 20 preferably are tapered downwardly from the top edge 36 toward the bottom edge 38 to facilitate installation of the grid into the network of intersecting channels 32 and 34.

The grid 14 is molded or otherwise formed, preferably as a one-piece unit, from a synthetic plastic material capable of becoming flowable upon being heated to a predetermined temperature and hardening to substantially its original properties upon cooling. Various suitable synthetic plastic materials can be used. Organic thermoplastic materials, such as nylon, polyethylene, polypropylene and cellulosic and acrylic resins are preferred.

To assemble a tile, wooden blocks of the size, color and end grain appearance required to provide the desired geometric and color arrangement are laid face down in the desired pattern on a flat surface and then clamped into abutting relationship in a suitable manner. For example, as illustrated in FIG. 2, the blocks **12*a* and 12*b* can be laid on a flat surface of a clamping fixture 40. The flat surface is surrounded by clamping plates or elements 42 which define a rectangular opening 44 approximating the outer periphery of the tile. The clamping fixture 40 includes fluid-operated rams 46 which are connected to the clamping elements 42. The rams 46 are actuated to square up the blocks 12*a* and 12*b*** and hold them in abutting relationship.

The grid ribs 20 are aligned with the network of intersecting channels 32 and 34 (FIG. 8) and then pushed down into the channels. A downward force and heat are applied to the top edges 36 of the grid ribs 20 in a suitable manner to melt or soften at least the top portion of each rib 20 and cause it to be diffused outwardly into pores and other cavities of the wood in the immediate vicinity of the lateral and longitudinal grooves 28 and 30. After cooling to a hardened state, the plastic material is intimately bonded to the wood in the immediate vicinity of the lateral and longitudinal grooves 28 and 30.

For example, referring to FIG. 9, a metal platen 50, having raised bosses 52 arranged in a grid network corresponding to that of the grid 14 and heated to a temperature above the melting point of the synthetic plastic material from which the grid is formed, is moved downwardly into contact with the top edges 36 of the grid ribs 20 and held in that position long enough to melt or soften at least the upper portion of the ribs. A downward force is applied by the platen 50 to push the grid ribs down into the grooves and to assist diffusion of the softened plastic material outwardly into the wood. The width of the platen bosses 52 preferably is greater than (e.g., 3 times) the thickness of the grid ribs 20 as shown in FIG. 9 so that the wood in the immediate vicinity of a groove is heated and slightly burned at the same time the plastic material is softened. While the mechanism is not fully understood at this time, it appears that heating the wood accelerates diffusion of the molten plastic material into the wood. In any event, it has been found that heating the wood increases the strength of the bond between the blocks and the grid. The wood should not be heated to the point where appreciable charring occurs because that can reduce the bond strength. As a general guide, when the grid 14 is formed from nylon or polyethylene, the platen 50 is heated to a temperature of about 600° F. and 450° F., respectively, and applied to the grid ribs and contiguous wood for approximately 10 seconds.

The downward force applied to the grid ribs 20 and the wood in the immediate vicinity of the grooves should not be much greater than about 25% of the crushing strength of the block(s) having the lowest crushing strength. On the other hand, this force should be high enough to flatten the wood in the immediate vicinity of the grooves to thereby compensate for surface irregularities and differences in the thicknesses of the blocks and provide an even contact of the platen bosses 52 with the grid ribs 20 and the adjacent wood. This promotes a more complete and uniform diffusion of the plastic material into the wood. As a general guide, the downward force applied by the platen bosses is about 250–1250 psi.

Upon cooling to ambient temperature, the grid 14 holds the blocks 12 together in abutting relationship, but permits them to move relative to each other because there is no adhesive or other bonding means at the joints between the blocks. The grid 14 is flexible enough to permit a tile to conform to the contour of an uneven floor, subfloor, wall, etc., during installation with a suitable adhesive. During use, the individual blocks can expand and/or shrink without causing a large opening at the joint because the shrinkage and swelling can be distributed between a number of joints between the blocks.

Figure 10:
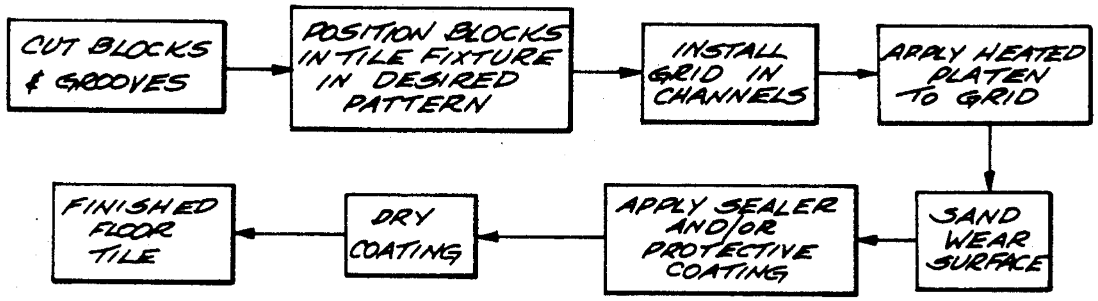
FIG. 10 is a diagrammatic representation of various steps in a production line for producing wooden tiles employing a plastic grid as a tying means.

FIG. 10 is a diagrammatic representation of various steps in a typical automated production line for producing wood tiles constructed in the manner illustrated in FIGS. 1–9. After the grid 14 has cooled to a hardened state, the resulting tile is turned over, passed through a sanding station where the wearing surface is smoothed by a conventional sanding device and wood dust subsequently removed by brushing and/or applying a vacuum, passed through a station where a UV sealer and/or a final protection coating is applied and then passed through a conventional drying device to accelerate drying of the final coating. After drying, the tiles are ready for packaging.

FIG. 11 illustrates an alternate embodiment in which a grid effectively is produced in situ. In this embodiment, the wooden blocks and grooves are dimensioned and arranged in the manner described above. However, instead of using a preformed grid, a molten synthetic plastic material like that used for the grid is injected into the channels formed by grooves in the blocks after they have been arranged in the desired pattern.

An extrusion head of a conventional plastic injection device has a die 56 including a plurality of raised ridges 58 arranged in a grid-like network corresponding to that of the intersecting channels formed by the block grooves and each ridge 58 has at least one opening 60 through which molten plastic material 62 is injected into a groove 64. The ridges 58 are heated to a temperature approximating that of the plastic material and, similar to the bosses on the heated platen described above, preferably are wider than the grooves 64. Portions 66 and 68 of the die ridges 58 on the opposite sides of a groove 64 are forced into sealing engagement with the underside 26 of a block so that the plastic material does not seep past the die. The grooves 64 are at least partially, and preferably substantially, filled with the molten plastic material 62. To facilitate this, the lower portion 70 of the grooves 64 preferably is enlarged to accommodate gas trapped in the groove 64. When the plastic material cools, the hardened material ties the blocks together in a manner similar to the grid described above. In addition to providing a seal against seepage of molten plastic material, the portions 66 and 68 of the die ridges 58 heat the wood in the immediate vicinity of the groove 64 to accelerate diffusion of the molten plastic material into the wood.

Forming a grid in situ in this manner can provide advantages over using a preformed grid in some cases. For example, a possible build up of manufacturing tolerances with respect to the dimensions of the block grooves and the grid ribs is of no concern because the grooves in effect act as molds for forming the ribs or tie members. Thus, a precise fit is assured. Also, more of the groove wall surfaces are heated by the molten plastic material than by a heat platen applied to the top edges of the grid ribs, thereby increasing the bonding area between the plastic material and the wood.

Figure 12:
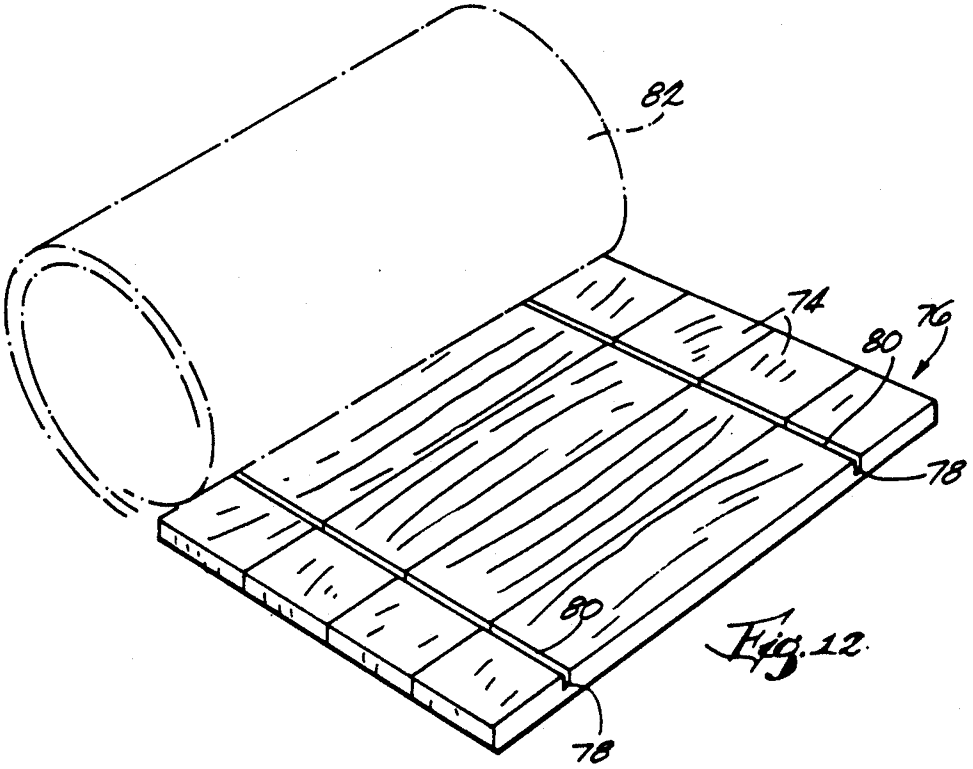
FIG. 12 is a bottom plan view of an alternate arrangement for the wooden tile.

FIG. 12 illustrates an alternate embodiment in which elongated rectangular blocks or slats 74 are arranged in a row side by side to form a tile 76 used as a border for inlaid carpet or the like. The slats 74 include one or more lateral grooves 78 which are aligned to form a continuous rectilinear channel when the slats 74 are positioned side by side. The slats 74 are tied together by a rib 80 of plastic material disposed in each channel and bonded to the wood in the immediate area of the grooves 78. The rib 80 can be preformed, inserted into a channel and the top edge and the contiguous wood heated as described above in connection with a preformed grid. Alternatively, the rib 80 can be formed in situ by injecting a molten plastic material into each channel as described above.

The plastic material used to form the rib 80 can be of a type flexible enough to permit relative long length of the tiling to be rolled up in a roll 82 as illustrated by the dashed lines in FIG. 12.

Figure 13:
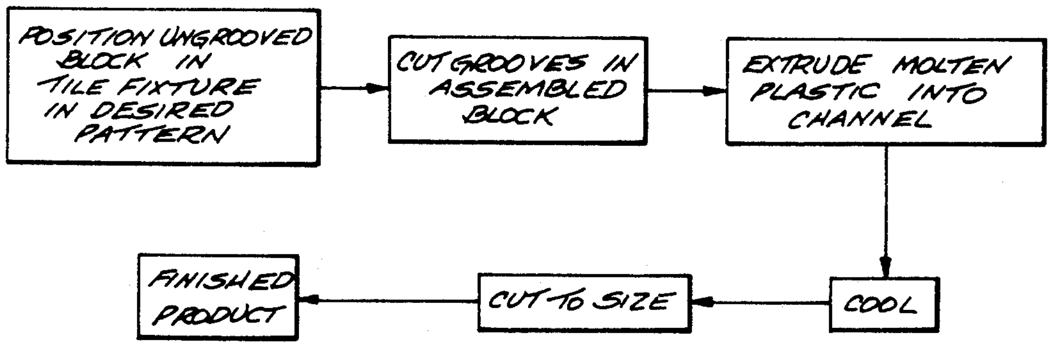
FIG. 13 is a diagrammatic illustration of a portion of a production line for producing wooden tiles employing a thermoplastic material extruded into channels formed by grooves in the wooden blocks as the tying means.

FIG. 13 is a diagrammatic representation of a portion of an automated, continuous production line for producing the tiling illustrated in FIG. 12 by forming the ribs 80 in situ. The lateral grooves 78 can be cut into the slats 74 prior to or after being assembled in a tile configuration. In the embodiment illustrated in FIG. 13, ungrooved slats are arranged in a desired pattern in a clamping fixture and clamped together in abutting relationship, passed through a cutting station where the laterally extending grooves 74 are cut in the slats to form channels, passed beneath the die of a plastic extrusion device similar to that illustrated in FIG. 11 where the channels are at least partially filled with a molten plastic material, advanced along the production line for sufficient time for the plastic material to harden (can be passed through a cooling means to accelerate cooling if desired) and passed through a cutting station where the tiling is cut into desired lengths. The tiles are subsequently sanded, sealed, etc., as described above to produce a finished product ready for packaging.

From the above description, it can be appreciated that the tying arrangement provided by the invention has a number of significant advantages over prior tying arrangements. Tiles having a wide variety of geometric and color patterns can be conveniently produced and the simplicity of the tying arrangement makes the overall production of tiles readily adaptable to automation to provide high rates of production. No separate adhesive is required because the plastic material is diffused into the wood. The plastic tying arrangement does not significantly increase the tile weight and tiles can be conveniently cut into the desired size and shape without a special cutting blade. The blocks remain permanently tied together during handling required for packaging, transportation and installation and during cutting. Relatively thin blocks, either flat grain or end grain, can be intimately tied together in the lateral and longitudinal directions and yet individual blocks can move relative to each other after a tile is installed. Because of the superior wearing characteristics and resistance to indentation, a wide variety of woods can be used for end grain blocks, including soft woods whose flat grain wear characteristics ordinarily are unacceptable for floor tiles and the like.

From the foregoing description, one skilled in the art can easily ascertain the essential characteristics of the invention and, without departing from the spirit and scope thereof, make various modifications and changes to adapt it to various usages.

We claim:

1. A rectangular wooden tile having first and second pairs of opposed peripheral edges and comprising a plurality of smaller rectangular wooden blocks disposed in substantial abutting relationship and including opposed sides and end edges, a lateral dimension between said side edges and a longitudinal dimension between said end edges which are equal to or a multiple of said lateral dimension, an underside and a top side having a wearing surface, each of said blocks having in the underside thereof at least one first groove extending laterally between said side edges and parallel to and spaced inwardly from said end edges and at least one second groove extending longitudinally between said end edges, parallel to and spaced inwardly from said side edges and intersecting said first grooves, said blocks dimensioned and said grooves disposed in said blocks such that, when said blocks are either side by side, side to end or end to end, said grooves are aligned to form first continuous, rectilinear channels extending parallel to each other and to the first pair of opposed peripheral edges of said tile and second continuous, rectilinear channels extending parallel to each other and to the second pair of opposed peripheral edges of said tile and intersecting said first channels to form a grid-like network of said channels; and a relatively flexible, synthetic plastic material, capable of becoming flowable upon heating above a predetermined temperature and hardening upon subsequent cooling, disposed in and substantially filling said channels, a portion of said plastic material being diffused into the wood in the immediate vicinity of said channels while in a flowable state and becoming bonded to the wood after hardening to thereby hold said blocks together and yet permit movement of said blocks relative to each other.

2. A wooden tile according to claim 1 wherein when both the lateral and longitudinal dimensions of a said block is A, the number of each of said first and second grooves is 1, the centers of said first and second grooves are centrally located and spaced inwardly 0.5A from the end edges of said block and the side edges of said block, respectively;

when the lateral and longitudinal dimensions of a said block are X·A and Y·A, respectively, with X and Y being an integer greater than 1, the number of said first grooves is Y, the number of said second grooves is X, the centers of said first grooves closest to the end edges of said block are spaced 0.5A inwardly therefrom, the centers of all said first grooves are uniformly spaced A from each other, the centers of said second grooves closest to the side edges of said block are spaced 0.5A inwardly therefrom and the centers of all said second grooves are uniformly spaced A from each other; and said blocks are arranged in the predetermined pattern to form a rectangular tile and said channel network.

3. A wooden tile according to claim 2 wherein said plastic material is preformed into a grid including a plurality of ribs which intersect at right angles and are arranged to fit into said channel network, said ribs having a height approximating the depth of said channels and a top edge; and after said grid is inserted into said channels, sufficient heat and pressure are applied to the top edges of said ribs to cause at least a portion of said plastic material to become flowable and diffused into the wood in the immediate vicinity of said channels.

4. A wooden tile according to claim 3 wherein said blocks are cut so the wearing surface is end grain.

5. A wooden tile according to claim 4 wherein said preformed grid is a one-piece unit.

6. A wooden tile according to claim 3 wherein said preformed grid is a one-piece unit.

7. A wooden tile according to claim 2 wherein said plastic material is extruded into said channels in a molten state and under pressure to diffuse a portion of said plastic material into the wood in the immediate vicinity of said channels.

8. A wooden tile according to claim 7 wherein said blocks are cut so the wearing surface is end grain.

9. A wooden tile according to claim 2 wherein said blocks are cut so the wearing surface is end grain.

10. A wooden tile according to claim 2 wherein A is approximately $1\frac{7}{8}$ inches.

11. A wooden tile according to claim 10 wherein said blocks are cut so the wearing surface is end grain.

12. A wooden tile according to claim 1 wherein said second grooves extend perpendicularly to said first grooves and said first and second channels intersect at right angles.

* * * * *